United States Patent Office 2,851,456
Patented Sept. 9, 1958

2,851,456
PROCESS FOR THE PREPARATION OF 11α-HYDROXY DIOSGENIN AND 11α-HYDROXY YAMOGENIN

Edward S. Rothman, Philadelphia, and Monroe E. Wall, Oreland, Pa., assignors to the United States of America as represented by the Secretary of Agriculture No Drawing. Application October 22, 1957
Serial No. 691,780

4 Claims. (Cl. 260—239.55)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The present invention relates to the preparation of 11α-hydroxy diosgenin (3β, 11α-dihydroxy-22a,25D-spirost-5-ene) and to its C–25 diastereoisomer, 11α-hydroxy yamogenin (3β,11α-dihydroxy-22a,25L-spirost-5-ene).

An object of this invention is to provide improved starting materials for the synthesis of cortisone. A particular object is to provide a new procedure for preparing 11α-hydroxydiosgenin and 11α-hydroxy yamogenin.

According to the present invention unsaturated, oxygenated steroids such as 3β,12β - diacetoxy - 22a,25D-spirost-5-en-11-one and 3β,12β-diacetoxy-22a,25L-spirost-5-en-11-one are reduced in systems comprising an alkali or alkaline earth metal, preferably potassium, sodium, lithium or calcium, dissolved in liquid ammonia to which relatively small amounts of protonic solvents selected from the group consisting of water, acetone, weak acids, and low molecular weight alcohols such as methanol and ethanol have been added, to produce 3β,11α-dihydroxy-22a,25D - spirost-5-ene and 3β,11α-dihydroxy-22a,25L-spirost-5-ene.

In our copending patent application Serial No. 644,183, filed March 5, 1957, we described the reduction by metal-ammonia systems of 3β,12β - diacetoxy - 22a,25D-spirost-5-en-11-one to obtain 11-keto diosgenin (3β - hydroxy-22a,25D - spirost - 5 - en - 11 - one). In that reduction we were particularly careful to avoid all traces of water and alcohol but nevertheless observed that small amounts of by-products were obtained wherein non-specific reduction of 3β-acetoxy to methylene must have occurred. In the present system, which is a much more powerful reducing system, there is reason to fear not only that non-selective reductive deacetoxylation would occur but also that saturation of the olefinic bond would occur. Indeed the literature records that under conditions employed in the present invention not only are certain unsaturated alcohols converted to hydrocarbons but the hydrocarbon benzene itself is partly hydrogenated.

It was surprising, therefore, that in the presence of added proton donating agents such as water and alcohol that the product of reduction by metal-ammonia systems of 3β,12β - diacetoxy - 22a,25D - spirost - 5 - en - 11 - one was 11α-hydroxy diosgenin, and not a 3-desoxy derivative or some other reduced form of the starting material. Unexpectedly, the systems containing water and alcohol reduced the C–12 acetoxyl function to methylene and the C–11 ketone to C–11α hydroxyl without affecting the C–5 double bond or reducing the 3β-acetoxyl function to methylene.

Moreover, when 3β,12β - diacetoxy - 22a,25D - spirost-5-en-11-one is reduced according to the procedure described in Example 1, the sole product formed is 11α-hydroxy diosgenin, and that product is formed in high yield. Similar treatment of 3β,12β - diacetoxy - 22a,25L-spirost-5-en-11-one, as described in Example 3, leads to formation of the new compound, 11α-hydroxy yamogenin. Acetylation of 11α-hydroxy diosgenin and 11α-hydroxy yamogenin was conducted under mild conditions to form 11α-acetoxy diosgenin acetate and 11α-acetoxy yamogenin acetate respectively.

A direct route of conversion of 11α-hydroxy diosgenin and 11α-hydroxy yamogenin to cortisone is described in our copending patent application Serial No. 644,184, filed March 5, 1957. An alternative, although less direct route from 11α-hydroxy diosgenin to cortisone involves catalytic hydrogenation (Adams catalyst in methanol containing 5% acetic acid) to 11α-hydroxy tigogenin, oxidation of 11α-hydroxy tigogenin to 11-keto tigogenone, and selective hydrogenation (Raney nickel catalyst) of the latter compound to 11-keto tigogenin, a known compound whose transformation to cortisone by several routes has been recorded in the chemical literature.

When 11α - hydroxy diosgenin and 11α - hydroxy yamogenin are converted to pregnene or pregnane compounds the single center of asymmetry which differentiates between them is destroyed and the same product is obtained from either starting material. Hence, in commercial practice the naturally occurring sapogenin sources of 3β,12β-diacetoxy-22a,25D-spirost-5-en - 11 - one and 3β,12β - diacetoxy - 22a,25L - spirost - 5 - en - 11 - one would not need to be separated and the reduction process of the present invention would be applied to mixture of the two to give a mixture of 11α-hydroxy diosgenin and 11α-hydroxy yamogenin.

The invention is described further by the following examples:

EXAMPLE 1

Reduction of 3β,12β - diacetoxy - 22a,25D - spirost-5 - en - 11 - one to 11α - hydroxy diosgenin.—A sample of 3β,12β - diacetoxy - 20α,22a,25D - spirost - 5 - en-one, 85 h. in 900 ml. of toluene was added to a solution of 67 grams of calcium metal dissolved in 4 liters of liquid ammonia during an addition time of 20 minutes. The mixture was mechanically stirred during the addition and during the subsequent reaction time of 10 minutes. Water was added cautiously in a thin stream until the blue color of the reaction mixture was discharged, an excess of water doing no harm. The mixture was evaporated in an open vessel to a white solid residue. This residue was shaken with ether and dilute aqueous hydrochloric acid until all solids were in solution. The organic layer was separated, washed with water and with saturated saline solution and evaporated to dryness. To insure complete saponification of the 3-acetate it was occasionally necessary to carry out a saponification step with 5% methanolic caustic. The product, M. P. 228–233°, was very soluble in hexane and ether but gave thick, hexagonal prism-like forms on recrystallization. The analytical sample thus obtained melted from 233–235° C. after undergoing crystal transition to whips over 228° C., $[\alpha]_D^{25} = -116°$ (CHCl$_3$). This compound is 11α-hydroxy diosgenin.

EXAMPLE 2

The procedures of Example 1 were repeated with the exception that lithium was used instead of calcium as the metal dissolved in liquid ammonia. The starting material, 3β,12β - diacetoxy - 20α,22a,25D - spirost - 5 - en-11-one was reduced to 11α-hydroxy diosgenin in good yield.

The reduction products of Examples 1 and 2 were further identified by conversion to acetate derivatives. In each instance 10 grams of 11α-hydroxy diosgenin was acetylated at 100° C. in a mixture of 25 ml. of acetic anhydride and 75 ml. of pyridine, followed by vacuum evaporation of the solvents. The residue was recrystallized from methanol to give the analytical sample of 11α-acetoxy diosgenin acetate, M. P. 195–198° C., $[\alpha]_D^{25} = -116°$ (CHCl$_3$).

EXAMPLE 3

*Reduction of 3β,12β - diacetoxy - 22a,25L - spirost-5 - en - 11 - one to 11α - hydroxy yamogenin.*—A solution of 10 grams of 3β,12β - diacetoxy - 22a,25L - spirost-5-en-11-one, in 200 ml. of tetrahydrofuran was added in 3 minutes' time to a solution of 4 grams of sodium metal dissolved in 600 ml. of liquid ammonia. The mixture was briefly swirled and 5 ml. of acetone was added. The solvents were evaporated and the solids were recovered and purified as in Example 1. The evaporated ether layer left a residue of 11α-hydroxy yamogenin, M. P. 248–250.5° C. Recrystallization from hexane-methylene chloride gave the analytical sample, M. P. 247.2–248.2° C., $[\alpha]_D^{25} = -122°$.

EXAMPLE 4

The procedures of Example 3 were repeated with the exception that potassium was the metal dissolved in the liquid ammonia. The product of the reduction was 11-hydroxy yamogenin.

11-hydroxy-yamogenin obtained from Examples 3 and 4 was acetylated as previously described. Recrystallization from methanol gave 11α-acetoxy yamogenin acetate as feathery masses of long, fine needles, M. P. 190–191.5° C., $[\alpha]_D^{25} = -123°$.

EXAMPLES 5 AND 6

In procedures similar to Example 3 the acetone was replaced by either methanol or ethanol. In each instance the reduction of 3β,12β - diacetoxy - 22a,25L - spirost-5-en-11-one to 11α-hydroxy yamogenin proceeded satisfactorily.

In the cited examples the actual yield of 11α-hydroxy steroids approached the theoretical yield.

For the purpose of this reduction the solvent in which the steroid is dissolved, as toluene in Example 1, is considered an inert vehicle and may be selected from among a number of suitable solvents, such as tetrahydrofuran, benzene, toluene, and dioxane.

As indicated in Example 1, the exact amount of water added is not critical as an excess did not harm the reaction.

We claim:

1. A process for the preparation of 11α - hydroxy diosgenin from 3β,12β - diacetoxy - 22a,25D - spirost-5-en-11-one, said process comprising reducing 3β,12β-diacetoxy - 22a,25D - spirost - 5 - en - 11 - one in a system comprising a solution of a metal selected from the group consisting of alkali metals and alkaline earth metals in liquid ammonia to which a weak proton donating solvent selected from the group consisting of water, acetone, and low molecular weight alcohols has been added.

2. A process for the preparation of 11α - hydroxy yamogenin from 3β,12β-diacetoxy - 22a,25L - spirost-5-en-11-one, said process comprising reducing 3β,12β - diacetoxy - 22a,25L - spirost - 5 - en - 11 - one in a system comprising a solution of a metal selected from the group consisting of alkali metals and alkaline earth metals in liquid ammonia, to which a weak proton-donating solvent selected from the group consisting of water, acetone, and low molecular weight alcohols has been added.

3. The process of claim 1 in which the metal is selected from the group consisting of sodium, potassium, lithium and calcium.

4. The process of claim 2 in which the metal is selected from the group consisting of sodium, potassium, lithium and calcium.

References Cited in the file of this patent

UNITED STATES PATENTS 2,776,969    Rosenkranz  ----------- Jan. 8, 1957

OTHER REFERENCES

Batres Mem. congr. cient. mex., IV Ventenario Univ. Mex. 2, 82–8 (1953).